United States Patent Office 3,412,327
Patented Nov. 19, 1968

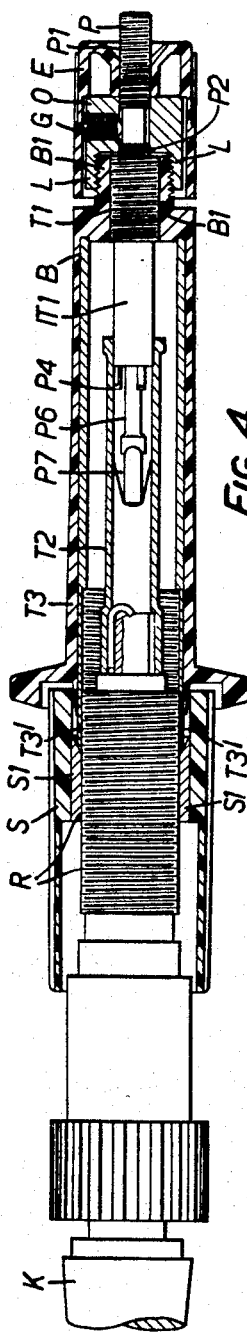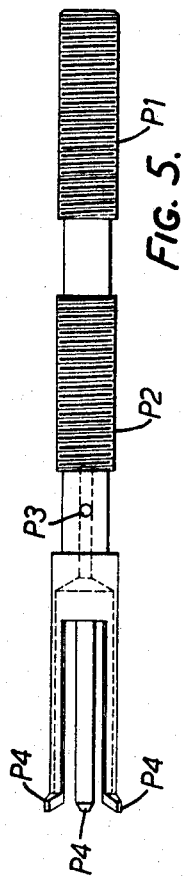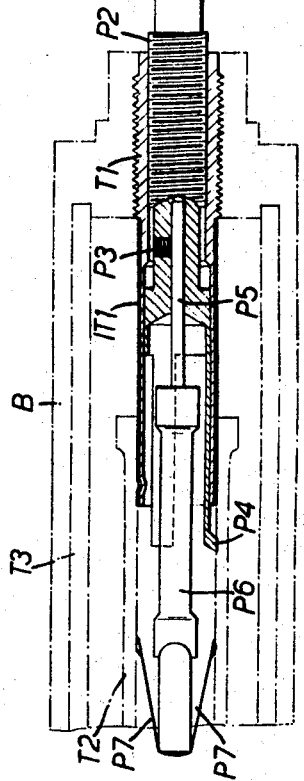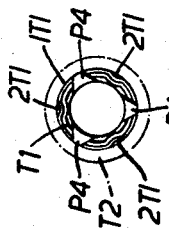

3,412,327
DUAL PURPOSE OSCILLOSCOPE AND LIKE PROBES HAVING SELECTIVELY CONNECTIBLE RESISTANCES
John Keith Murray, St. Albans, England, assignor to Marconi Instruments Limited, London, England, a British company
Filed Mar. 9, 1966, Ser. No. 532,935
Claims priority, application Great Britain, Mar. 18, 1965, 11,609/65
9 Claims. (Cl. 324—72.5)

ABSTRACT OF THE DISCLOSURE

A dual purpose electrical probe for an oscilloscope or the like includes three coaxial metal tubular members, spaced from one another, the inner member being the input signal electrode and the middle and other members being the output signal electrodes of the probe. An axially positioned resistance is connected at one end to the inner member and at the other end to a sliding contact arrangement, in slidable contact with the middle member. The inner member, resistance and sliding contact arrangement is movable longitudinally with respect to the middle member. A spring switch contact arrangement is electrically connected to the inner member and is relatively movable with respect to one of the inner and middle members. The member with respect to which the spring switch contact arrangement is relatively movable is so shaped that in one position in the range of relative movement the switch contact arrangement contacts the middle member and in a further position in the range of relative movement the switch contact arrangement does not so contact.

This invention relates to oscilloscope probes by which expression is meant contact devices adapted to be connected to an oscilloscope or other measuring apparatus for supplying thereto voltages, currents or wave forms which are to be measured or displayed and which are present at some circuit point with which the probe is placed in contact.

The invention is illustrated in and explained in connection with the accompanying drawings in which FIGURE 1 is a circuit diagram illustrative of known usual practice and showing a probe connected by a cable to an oscilloscope;

FIGURE 4 is a sectional elevation of a switchable probe in accordance with this invention;

FIGURE 5 is a detail view showing one of the parts of the probe of FIGURE 4; and FIGURES 5, 6 and 7 are mutually perpendicular sectional views showing certain other details of the probe of FIGURE 4. FIGURES 5, 6 and 7 are to a larger scale than FIGURE 4.

Figure 1:
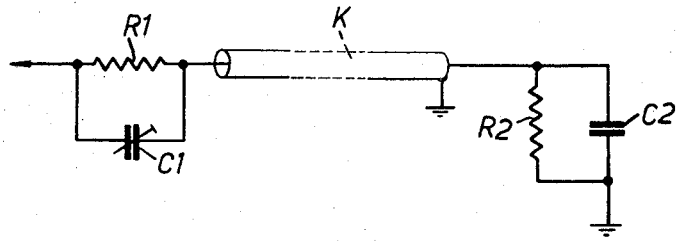

The known probe shown in FIGURE 1 comprises the actual contact, represented by the arrow head, a series resistance R1 and an adjustable condenser C1 across the resistance R1. It is connected by a cable K to the oscilloscope or other measuring or indicating device which is not shown but the input impedance of which is represented by a resistance R2 in parallel with a capacitance C2. The relation between the values of R1 and R2 is so chosen that the resistive potential divider which they constitute provides an attenuation ratio of desired value. The adjustable shunt condenser C1 is provided in order that the desired attenuation ratio may be maintained at high frequencies. As will be seen it constitutes the series element of a capacitive potential divider the shunt portion of which is constituted by the input circuit capacitance C2 in parallel with the capacitance $K_K$ of the cable. Condenser C1 is adjusted so that the attenuation ratio of the capacitive potential divider is substantially the same as that of the resistive potential divider, i.e., so that the ratio R1/R2 is substantially the same as the ratio of C1 to C2 in parallel with $K_K$.

In practice R2 is often quite high—about 1 megohm is not uncommon—and this can cause the probe lead or cable K, which is normally co-axial, to be presented with a serious impedance mis-match at the oscilloscope end. Since this could cause serious distortion of input pulse wave forms with fast rise and/or fall times it is common practice to make the inner cable conductor resistance and of value chosen to result in minimum distortion. It is also, in practice, most desirable that any capacitative loading imposed by the probe on the circiut under test should be kept as low as possible and for this reason the cable capacity $K_K$ and any shunt capacity in the probe itself, should be as low as possible.

Figure 2:
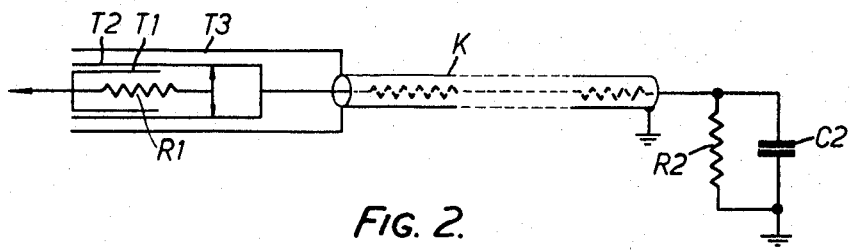
FIGURE 2 is a schematic representation of a typical known probe connected by a cable to an oscilloscope and showing how resistance and capacitance are usually provided in the probe.

FIGURE 2 shows diagrammatically the sort of arrangement which is usually adopted with the object of satisfying the foregoing requirements. The probe itself is of tubular construction comprising three co-axial metal tubes T1, T2 and T3. The innermost tube, co-axially within which is the series resistance R1 is slidable longitudinally within the middle tube T2. It is connected to one end of resistance R1 the other end of which is connected to brush contacts which contact with and slide along the tube T2 as conventionally indicated, the parts T1, R1 and the brush contacts being slidable as a unit. A layer of dielectric material (not shown) is commonly provided on the outside of T1. The capacitance C1 of FIGURE 1 is constituted by the capacitance between the tubes T1 and T2 and is adjustable by longitudinally sliding the former in or out of the latter. T2 is connected to the inner conductor, shown as resistive in FIGURE 2, of the cable K. The outermost tube T3 is spaced from T2 and is connected to the earthed outer conductor of the cable.

Figure 3:
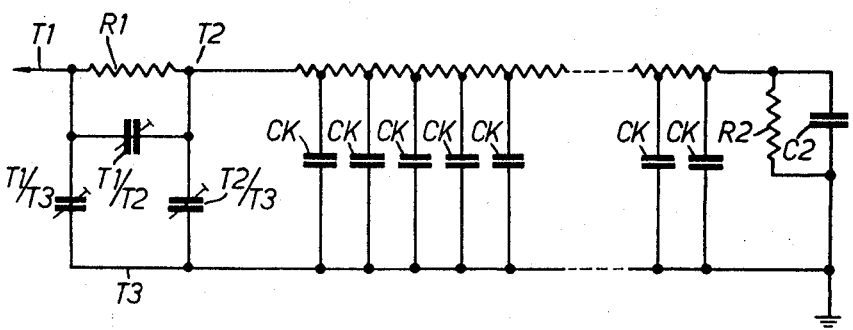
FIGURE 3 is an equivalent circuit diagram of the known arrangement of FIGURE 2.

FIGURE 3 is the equivalent electrical circuit of FIGURE 2. The adjustable capacitance T1/T2 is that between the tubes T1 and T2; the adjustable capacitance T1/T3 is that between tubes T1 and T3 and varies when T1 is moved; the capacitance T2/T3 is that between the tubes T2 and T3; and the distributed cable capacitance $K_K$ is represented by the shunt capacitances $C_K$. The fixed capacitance T2/T3 is normally considerably larger than T1/T3 and both these capacitances are, as already explained, undesirable. The extent to which they can be reduced is, however, severely limited by considerations of mechanical size, for the diameters of the tubes T1 and T2 must be as small as possible in relation to that of the tube T3 but T1 must be of large enough diameter to house the resistance R1.

In some cases, however, the series resistance R1 is not required and a "straight through" probe is wanted. To provide a mechanically satisfactory probe of reasonably small size which incorporates a switch which will cut out the resistance R1 when required without materially increasing either the capacitance T2/T3 or T1/T3 due to the provision of the switch obviously presents difficult problems of design which, so far as the applicants are aware, have not yet been solved. Present usual practice is to provide an entirely separate "straight through" probe for use when required. This is a nuisance since it means that one probe must be replaced in circuit by another when it is required to change over from a "resistance" probe to a "straight through" probe or vice versa. The present invention seeks to solve these problems and to provide a satisfactory switchable dual purpose probe which can be readily switched over from a "straight through" condition to a "resistance" condition or vice versa whenever required. For brevity of reference such a dual purpose switchable probe will hereinafter be termed a "dual purpose probe."

According to this invention of a dual purpose probe includes three co-axial metal tubular members spaced from one another and of which the inner member is the input signal electrode of the probe and the middle and outer members are the output signal electrodes of the probe; an axially positioned resistance connected to said inner member at one end; sliding contact means connected to the other end of said resistance and in slidable contact with said middle member; means for moving said inner member, resistance, and sliding contact means longitudinally together with respect to said middle member; and spring switch contact means electrically connected to said inner member and relatively movable in pre-determined manner with respect to said inner member or with respect to said middle member, the member with respect to which said switch contact means is relatively movable in said pre-determined manner being so shaped that in one position in said relative movement said switch contact means contact with said middle member and in another position in said relative movement said switch contact means do not so contact.

Preferably the switch contact means are relatively movable in said pre-determined manner with respect to the inner member and comprise one or more spring contact fingers extending within said inner member and arranged in one position of relative movement, to be forced out of contact with the middle member and, in another position of relative movement, to be free to spring into contact with said middle member. In embodiments of this nature the inner member is preferably slotted, tapered, dimpled, flattened or otherwise deformed in such manner that, in one position of relative movement, the spring contact means are forced inwardly and in another are free to spring outwards into contact with the middle member.

Preferably the pre-determined relative movement is a rotational movement. It is, however, possible so to arrange matters that movement of the switch contact means into and out of contact with the middle member is obtained by a longitudinal relative movement.

Preferably also the pre-determined relative movement is limited. Although it is preferred, as above stated, to provide the pre-determined relative movement between the switch contact means and the inner member it is obviously possible to arrange it to occur between said contact means and the middle member and to deform said middle member locally in such manner that, in one position of relative movement, the spring contact means contact therewith. Thus, for example, one or more outwardly biassed spring contacts with limited outward movement and electrically connected to the inner member and moving therewith, could be provided and the middle member could be so formed that in one pre-determined position of the inner member, said contact or contacts reach the said middle member. Thus, for example, the middle member could be provided with an inwardly projecting ring near one end so that, when the inner member is at one extreme position of a longitudinal sliding movement, the spring contact or contacts reach the ring but cannot reach the middle member when the inner member is moved away from this extreme position. The at present preferred embodiment is, however, shown in FIGURES 4 to 6 inclusive.

Referring to FIGURES 4 to 6 the probe therein shown includes an axially contral beryllium-copper part P, shown in detail in FIGURE 5, which is tubular and projects out of the probe at one end. It is threaded at P1 to receive "nose" attachments (not shown) for putting it in electrical connection with a circuit point at which wave forms to be measured or indicated occur. At its other end the part P is formed with contacts P4 on the ends of outwardly biassed spring contact arms. It is also threaded at P2 and has solder hole P3. In place of the hole P3 a transverse slot may be used. It has an axial bore in which is inserted and soldered (through the hole P3) a lead P5 (see FIGURE 6) connected to one end of a resistance P6 which corresponds to the resistance R1 of FIGURES 1 to 3. The other end of this resistance is connected to outwardly sprung brush contacts P7 which can slide on the inside of a brass tube T2 which corresponds to the tube so referenced in FIGURE 2.

A plastic end cap E is keyed on to a plastic switch handle O which is fixed in relation to the part P by one or more grub screws—a single grub screw G is shown—a grub screw G and has two squared lugs or ears L intermeshing with squared lugs or ears B1 formed on a pastic body moulding B (FIGURE 4). The intermeshing lugs on the parts O and B permit the former part to be rotated in relation to the latter by about 60°. The parts L and B have engaging deformations which act as detents in the end positions of rotation so that these end positions can be felt by an operator as the deformations "click" into engagement. The part B has a moulded-in metal tube T3, corresponding to the part so referenced in FIGURE 2 and is internally threaded at T3'.

A stainless steel tube T1, which corresponds to the tube so referenced in FIGURE 2 is screwed on to the thread P2 on the part P. Shrunk on to the tube T1 is a P.T.F.E. sleeve 1T1. This tube T1 is inwardly "dimpled" near one end by three "dimples 2T1 (see FIGURE 7) at 120° which make the end of T1 nearer the contacts P4 roughly triangular in shape (as best shown in FIGURE 7). The tube T1 is made very thin walled over the length covered by the P.T.F.E. sleeve 1T1 to accommodate the spring arms carrying the contacts P4 and permit them to spring out and contact with T2 when the said arms are in the "corners" of the roughly triangular end section of T1. The brass tube T2 is a moderately stiff sliding fit on the P.T.F.E. sleeve 1T1.

S (see FIGURE 4) is a plastic locking sleeve which has moulded into it a nut S1 which screws on to a threaded barrel R. The end of the tube T3 adjacent the nut is split longitudinally (the splits are not shown) so that when the locking sleeve with its nut S1 is screwed along the barrel R (which forms part of a cable gland for the connecting cable K) towards the tube T3, the end of the nut, which is chamfered, closes the slit end of tube T3 a little and locks it on the thread.

The capicitance T1/T2 can be adjusted, after slacking back the locking sleeve S by screwing the body B along the thread T3' to move the tube T1 endwise in T2. When the required capacitance is found the sleeve S is re-tightened. To operate the switch the parts E and O and therefore the part P are rotated through the permitted rotational angle of 60°. At one end of this rotation the "triangulated" end of tube T1 permits the arms carrying the contacts P4 to lie in the "corners" of the "triangulation" and the contacts P4 connect the tubes T1 and T2 directly together. This is the "straight through probe" condition of switching. At the other end of the rotational movement the "sides" of the "triangulated" end of T1 force the arms carrying the contacts P4 inwardly to break the direct connection between tubes T1 and T2. This is the "resistance probe" condition of switching.

Many modifications are possible. Thus, for example, instead of "dimpling" the end of the tube T1 it could be castellated, i.e., provided with longitudinal slots at one end to permit the contact arms to spring out through the slots when in the "straight through" condition of switching. Again, for example, instead of providing limited rotational relative movement between the tube T1 and the switch arms, limited longitudinal movement could be provided for and the tube T1 provided with an internally tapered collet to force in the contacts P4 at one end of such movement and permit them to spring out at the other. It is also possible to dispense with relative switching movement between the contact arms and the tube T1 altogether and merely to limit the outward spring movement of the contacts and provide the inner surface of the tube T2 with an internally projecting ring near one end so that only when the tube T1 is longitudinally slid to one of its extreme positions can switch contacts reach the tube T2. Numerous other modifications are obviously possible.

I claim:
1. A dual purpose probe including three co-axial metal tubular members mounted in spaced apart relation, an inner member of said three members providing the input signal electrode of the probe and an outer member and middle member of said three members providing output signal electrodes of the probe, an axially positioned resistance connected at one end thereof to said inner member, sliding contact means connected to the remaining end of said resistance and in slidable contact with said middle member, means for moving said inner member, resistance and sliding contact means longitudinally together with respect to said middle member, spring switch contact means electrically connected with said inner member and mounted for predetermined relative movement with respect to at least one of said inner and middle members, and said at least one member including preshaped spring switch contact actuating means for providing disconnection and connection of said spring switch contact means with said middle member in first and second positions in said predetermined relative movement, respectively.

2. A probe as claimed in claim 1 wherein the predetermined relative movement is limited.

3. A probe as claimed in claim 1 wherein the predetermined relative movement is rotational.

4. A probe as claimed in claim 1 wherein the predetermined relative movement is longitudinal.

5. A probe according to claim 1 wherein said spring switch contact means are mounted for said predetermined relative movement with respect to said inner member and wherein said spring switch contact means comprise at least one spring contact finger extending within said inner member, said spring switch contact actuating means comprising means for forcing said spring contact finger out of contact with said middle member in said first position and for releasing said spring contact finger for contact with said middle member in said second position.

6. A probe according to claim 5 wherein said means for forcing comprises a deformed portion of said inner member for forcing said contact finger inwardly away from said middle member in said first position and for releasing said spring contact finger to spring outwardly toward said middle member in said second position.

7. A probe according to claim 1 wherein said spring switch contact means are mounted for said predetermined relative movement with respect to said middle member and wherein said spring switch contact actuating means comprises a deformed portion of said middle member for contacting said spring switch contact means in said second position.

8. A probe according to claim 7 wherein said spring switch contact means comprise at least one outwardly biased spring contact having limited outward movement, said inner member being mounted for relative movement with said spring contact means and said deformed portion of said middle member extending into contact with said at least one outwardly biased spring contact when said spring switch contact means and inner member are in said second position.

9. A probe according to claim 8 wherein said deformed portion of said middle member comprises an inwardly extending ring, said second position of relative movement being one extreme position of longitudinal movement, said at least one outwardly biased spring contact extending outwardly into contact with said ring in said second position and extending outwardly insufficiently to contact said middle member when moved from contact with said ring.

References Cited

UNITED STATES PATENTS

| | | | |
|---|---|---|---|
| 2,790,144 | 4/1957 | Sicho | 324—72.5 |
| 3,283,248 | 11/1966 | White | 324—72.5 |

ARCHIE R. BORCHELT, *Primary Examiner.*

E. L. STOLARUN, *Assistant Examiner.*